US006152334A

United States Patent [19]

Liardon et al.

[11] Patent Number: 6,152,334

[45] Date of Patent: Nov. 28, 2000

[54] SCRAPING ELEMENT, PISTON AND ARRANGEMENT FOR EMPTYING A BAG-LIKE ENVELOPE CONTAINING A PASTY LIQUID

[75] Inventors: Olivier Liardon, Le Mont-sur-Lausanne; Jean-Pierre Sanga, Mathod, both of Switzerland

[73] Assignee: Sicpa Holdings S.A., Prilly, Switzerland

[21] Appl. No.: 09/367,811

[22] PCT Filed: Feb. 13, 1998

[86] PCT No.: PCT/EP98/00833

§ 371 Date: Aug. 23, 1999

§ 102(e) Date: Aug. 23, 1999

[87] PCT Pub. No.: WO98/42614

PCT Pub. Date: Oct. 1, 1998

[30] Foreign Application Priority Data

Mar. 24, 1997 [EP] European Pat. Off. .............. 97810171

[51] Int. Cl.[7] .............................................. G01F 11/42

[52] U.S. Cl. .......................... 222/342; 222/326; 222/386

[58] Field of Search ............................ 222/95, 105, 326, 222/340, 386

[56] References Cited

U.S. PATENT DOCUMENTS

| | | | |
|---|---|---|---|
| 3,612,359 | 10/1971 | Sundholm | 222/309 |
| 5,000,355 | 3/1991 | Pritchard | 222/256 |
| 5,577,641 | 11/1996 | De Laforcade et al. | 222/386 |
| 5,961,007 | 10/1999 | Dornbusch et al. | 222/386 |

FOREIGN PATENT DOCUMENTS

| | | |
|---|---|---|
| 42 31 420 | 3/1994 | Germany . |

*Primary Examiner*—Kevin Shaver
*Assistant Examiner*—David A. Bonderer
*Attorney, Agent, or Firm*—Shoemaker and Mattare

[57] ABSTRACT

An arrangement for emptying a bag like envelope containing a pasty liquid consists substantially of a rigid housing for the envelope and an axially movable piston for compressing the envelope and for discharging the liquid through a discharge opening in the housing. The piston comprises on its outer edge at least one scraping element which is movable between an insertion position, and a scraping position. In the insertion position, the scraping edge of the scraping element is spaced from the inner surface of the housing. In the scraping position, the scraping edge is pressed against the inner surface of the housing.

16 Claims, 4 Drawing Sheets

Figure 1A:
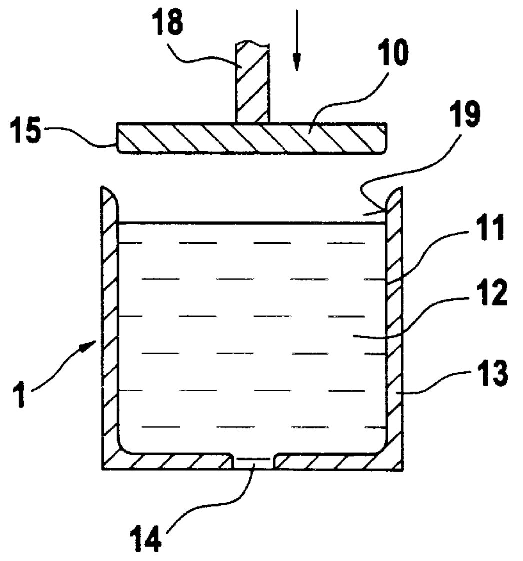

SCRAPING ELEMENT, PISTON AND ARRANGEMENT FOR EMPTYING A BAG-LIKE ENVELOPE CONTAINING A PASTY LIQUID

The invention relates to an element, a piston and an arrangement for compressing and emptying a bag-like envelope according to the preamble of the independent claims.

Pasty liquids such as printing inks are frequently delivered in flexible bags. These bags may be transported in containers made e.g. from cardboard conforming to the outer shape of the bag. Such a package has been described in EP 723 920. In order to be used in a printing machine, the ink has to be emptied from the bag prior to use.

There is known an arrangement for emptying the bag which comprises a draining can provided with a dispensing aperture. The bag can be put in the can and the pasty liquid may be disposed through a hole in the bag and through the dispensing aperture of the draining can.

Due to the high viscosity of pasty liquids such as printing inks, it may be necessary to exert a certain pressure for emptying a bag. Known arrangements have therefore been provided with a piston which is axially movable within the draining can. The outer edge of the piston conforms to the inner surface of the can. Upon axial downward movement of the piston, the content of the bag placed in the can is compressed and dispensed through the dispensing aperture of the can. When the bag has been emptied, the piston has to be completely removed from the can before putting a new full bag into the can.

This known draining arrangement however has certain drawbacks. On the one hand, the outer edge of the piston has to be in engaging contact with the inner surface of the can in order to prevent the bag from passing in a gap between the outer edge of the piston and the inner surface of the can. If there is a gap between the piston and the inner surface of the can, parts of the bag may pass through the gap and obstruct the removal of the piston. On the other hand, a piston with an outer edge which exactly conforms to the inner surface of the can will be hard to insert into the can. In some cases, the outer edge of the piston is even provided with a resilient element which is slightly larger than the inner surface of the can in order to exert a pressure on the inside surface. In these cases, it is hardly impossible to reintroduce the piston into a can.

DE 42 31 420 discloses a piston for emptying an envelope in a housing. The piston is made flexible and comprises an outer edge which is engagable with the inner surface of the housing. For emptying the envelope, a rod is axially pressed on the piston. The piston is thereby deformed and its outer edge is pressed against the inner surface of the housing. For removal of the piston, the rod is released and the outer edge of the piston gets out of engagement with the inner surface of the housing, due to its elasticity.

It is an object of the present application to avoid the drawbacks of the state of the art, especially to provide a piston and an arrangement with a piston for compressing and emptying a bag-like envelope, which piston may be easily introduced into the can and which comprises an outer edge which is able to be brought in scraping contact with the inner surface of the can.

According to the invention, these objects are solved with a scraping element, a piston and an arrangement comprising the features of the characterizing portion of the independent claims. An axially movable piston for compressing and emptying a bag-like envelope containing a pasty liquid comprises on its outer edge at least one scraping element. The scraping element comprises a scraping edge which is engageable with the inner surface of a rigid outer housing with a discharge opening. The bag-like envelope is put into the housing. The scraping element is movably connected to the outer edge of the piston and is movable between a first insertion position and a second scraping position. In the insertion position, the scraping edge of the scraping element is arranged at a smaller radial distance from the axis of the piston. In the scraping position, the scraping edge is engageable with the inner surface of the housing. When the piston is inserted into the outer housing, the scraping element is in the insertion position and the scraping edge does not engage the inner surface of the housing. The piston may therefore be easily inserted. Once the outer edge of the piston is within the housing, the scraping edge may be moved from the insertion position into the scraping position and engages the inner surface of the housing. When the piston is moved axially downward, the bag-like envelope is compressed and the liquid is discharged through the discharge opening. As the scraping edge now is in engagement with the inner surface of the housing, the bag cannot pass between the piston and the housing.

In a preferred embodiment, the scraping element is pivotably attached to the outer edge of the piston. The scraping element can be pivoted between the insertion position and the scraping position.

Further, the scraping element is preferably provided with a lever for pivoting the element from the insertion position into the scraping position. The lever is engageable with the inner surface of the housing when the scraping element is in the insertion position. When the piston is inserted into the housing, the lever first contacts the rim of the housing and causes a pivoting movement of the element into the scraping position. The scraping edge of the scraping element is thus pressed against the inner surface of the housing because of the inner surface of the housing acting on the lever.

In a further preferred embodiment, the scraping element comprises a spring element, which is tensioned in the scraping position. As soon as the piston is removed from the housing, the spring tends to return the scraping element into the introducing position. Thereby is ensured, that the scraping element is always in the insertion position prior to be inserted into the housing.

In a further preferred embodiment, the scraping element is integrally formed of plastic material.

The scraping edge may further be preferably formed as the intersection between two surfaces which enclose an angle which is smaller than 90°. With a pointed angle, the scraping action of the scraping edge is enhanced.

The piston is preferably cylindrical and comprises a cylindrical outer edge. Preferably, between 4 and 48 scraping elements are equally spaced on the outer edge of the piston. The scraping elements may be snapped onto or into the outer edge which allows to exchange the scraping elements easily once a scraping element should be broken.

The arrangement for compressing and emptying a bag-like envelope containing a pasty liquid consists substantially of an axially movable piston and a rigid housing. The piston is movable into the rigid housing for compressing the envelope and for emptying the content of the envelope through a discharge opening provided in the housing. The piston comprises on its outer edge at least one scraping element which is movable between a first insertion position and a second scraping position. The scraping element comprises a scraping edge which is radially spaced from the inner surface of the housing in the insertion position. When the piston is inserted into the housing, the scraping edge is moved from the insertion position into the scraping position. In the scraping position, the scraping edge is pressed against the inner surface of the housing.

In a preferred embodiment, the scraping element is pivotably connected to the outer edge of the piston.

Figure 1B:
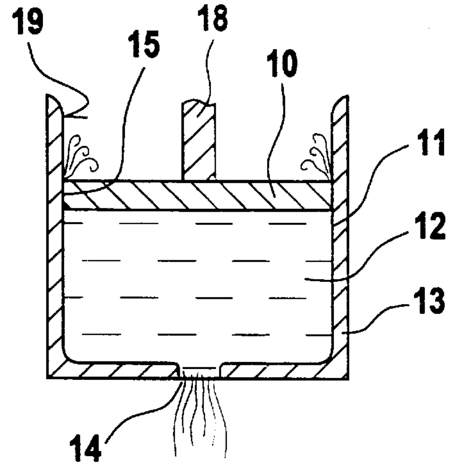
Figure 2A:
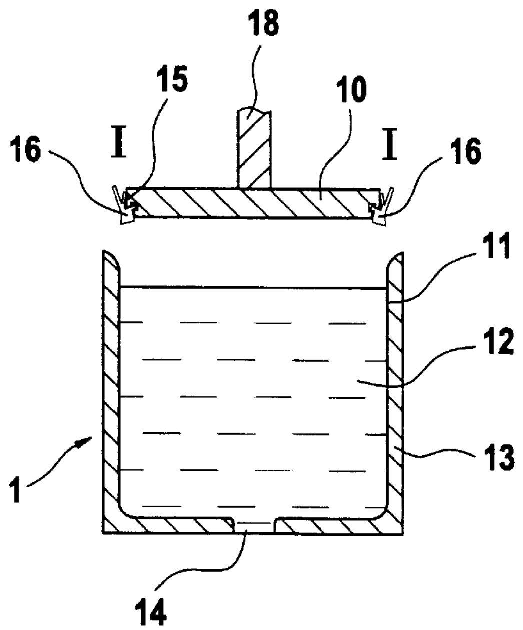
Figure 2B:
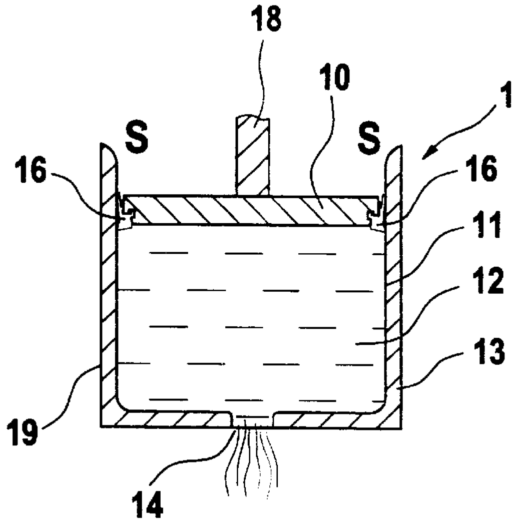
Figure 3:
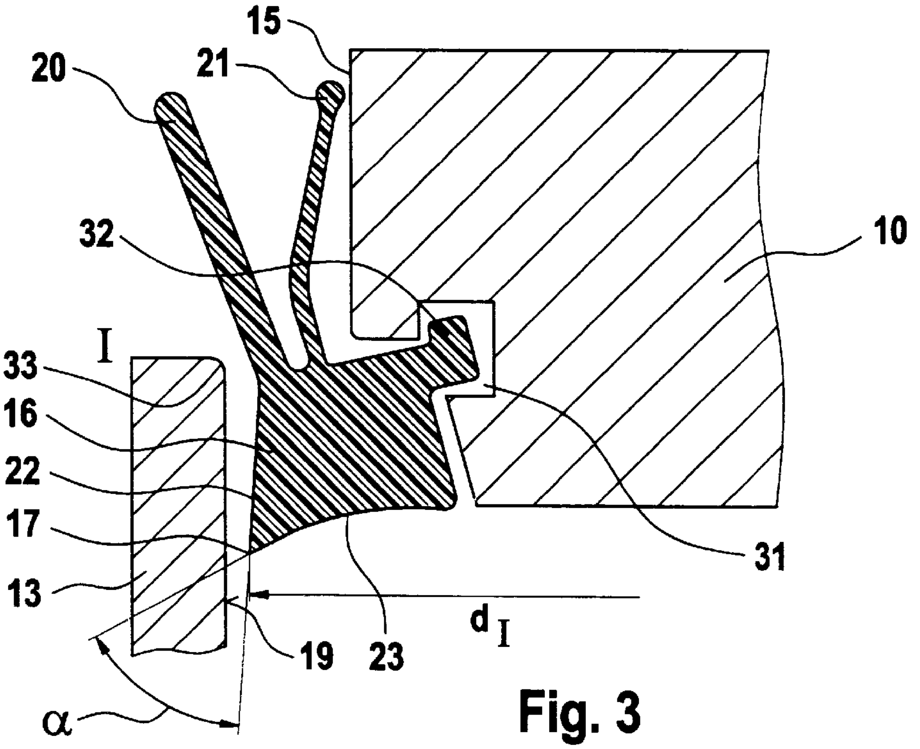
Figure 4:
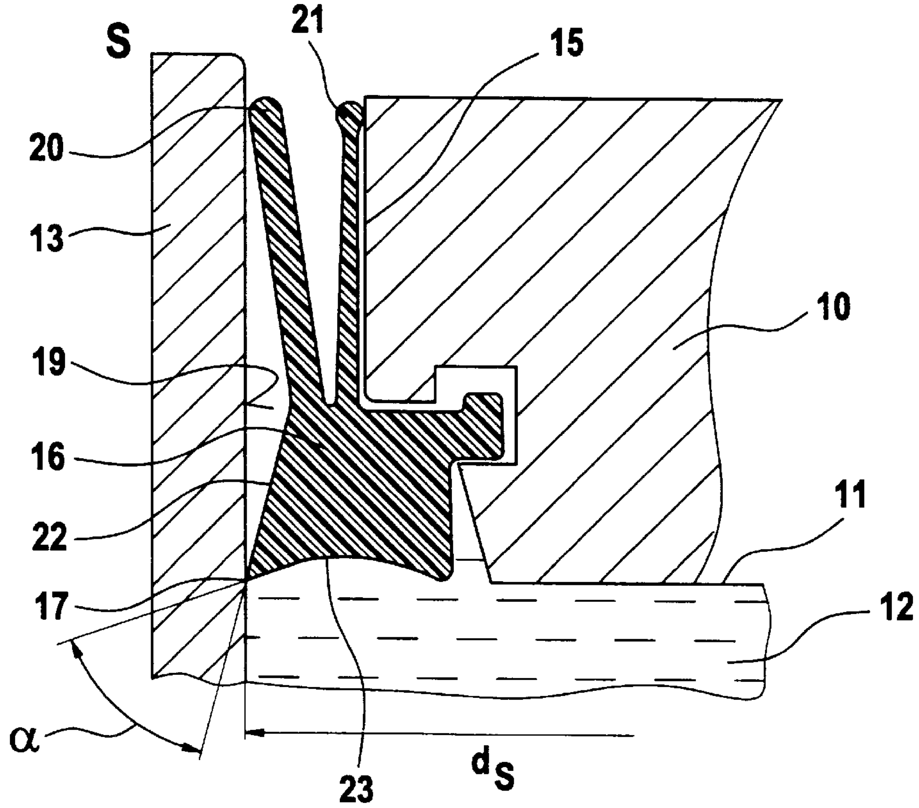
Figure 5:
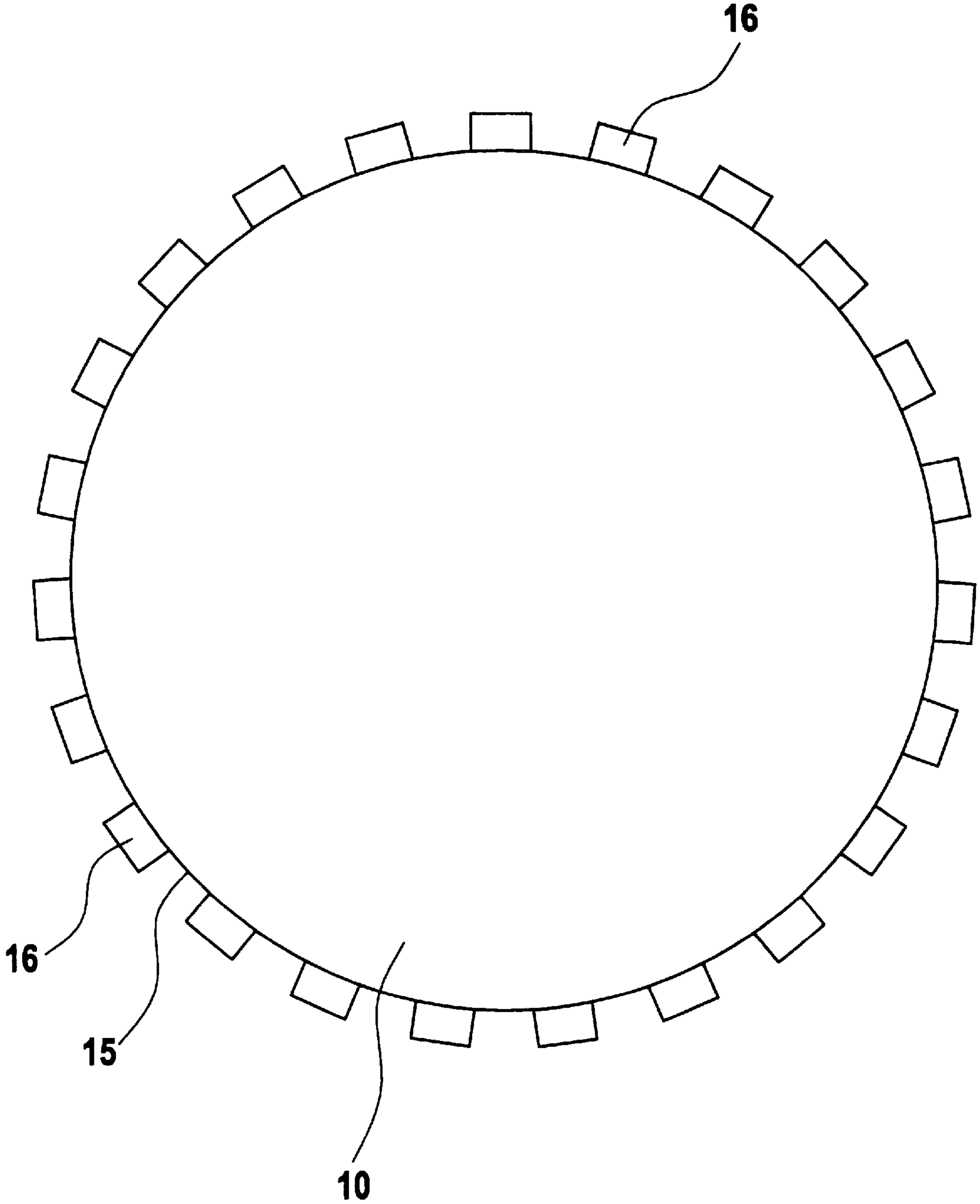
Figure 6A:
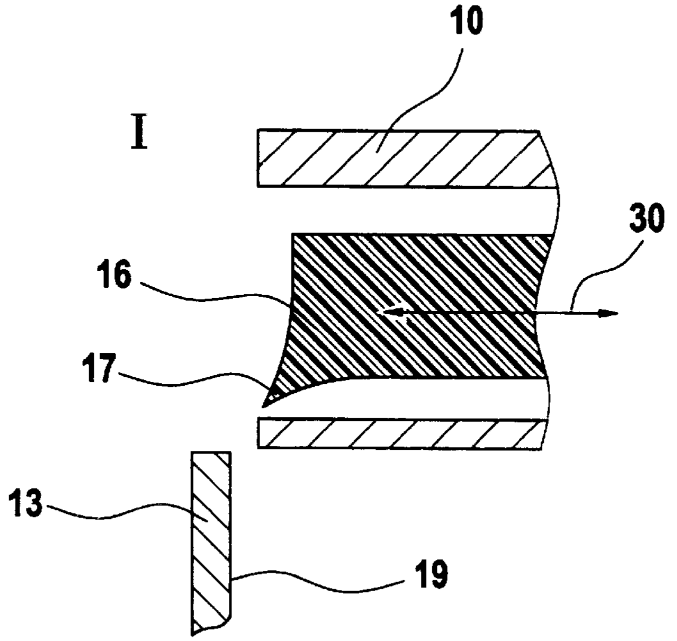
Figure 6B:
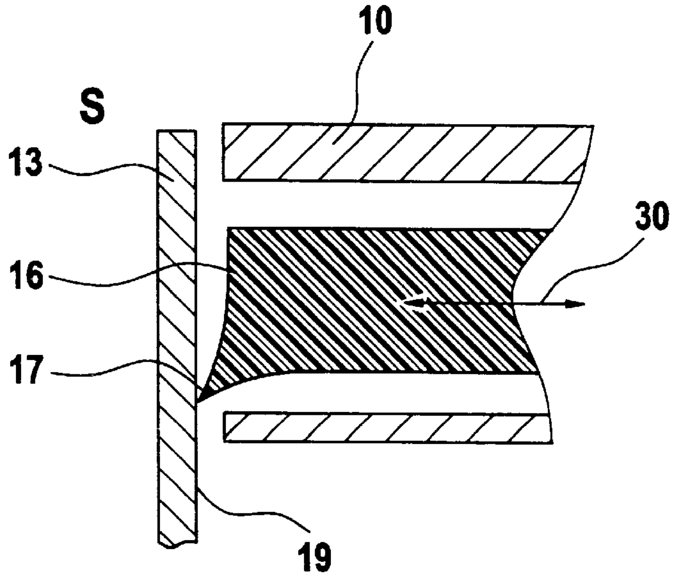

Examples and embodiments of the invention are more closely described in the following, illustrated by the drawings, namely showing;

FIG. 1*a* an arrangement of the prior art prior insertion of the piston,

FIG. 1*b* an arrangement of the prior art after insertion of the piston,

FIG. 2*a* an arrangement according to the invention prior to the insertion of the piston, FIG. 2*b* the arrangement of FIG. 2*a* after insertion of the piston, FIG. 3 an enlarged cross sectional view of a piston according to the invention in the insertion position, FIG. 4 an enlarged cross sectional view of a piston according to the invention in the scraping position, FIG. 5 a top view of a piston according to the invention and, FIGS. 6*a* and 6*b* an alternative embodiment of the invention with a scraping element in the insertion and in the scraping position.

FIGS. 1*a* and 1*b* show an arrangement 1 known from the prior art. A bag-like envelope 11 comprising a pasty liquid 12 is placed into a housing 13 which is provided with a discharge opening 14. The arrangement 1 further comprises a piston 10 which is movable along an axis 18. When the piston 10 is inserted into the housing 13, the envelope 11 is compressed and the liquid 12 may be discharged through the discharge opening 14. FIG. 1*b* shows the arrangement 1 wherein the piston 10 is inserted into the housing 13. The bag-like envelope 11 is compressed and emptied. Between the outer edge 15 of the piston 10 and the inner surface 19 of the housing 13 remains a gap. Parts of the emptied bag 11 may pass through the gap. When the envelope 11 is completely emptied, the piston 10 will have to be removed. Because of the envelope 11 passing over the outer edge 15 of the piston 10, the piston 10 and the envelope 11 will remain connected together and will have to be separated after removal of the piston from the housing 13.

FIGS. 2*a* and 2*b* show corresponding situations as FIGS. 1*a* and 1*b* with an arrangement comprising the features of the invention. The piston 10 is provided on its outer edge 15 with scraping elements 16. The scraping elements 16 comprise a scraping edge (see FIGS. 3, 4) which is engageable with the inner surface 19 of the housing 13. The scraping elements 16 are arranged pivotably on the outer edge 15 of the piston 10. In an insertion position I, the scraping elements 16 are arranged in such a way that the scraping edge 17 will not get in engagement with the inner surface 19 of the housing 13. The piston 10 can therefore be easily inserted into the housing 13.

FIG. 2*b* shows the arrangement 1 wherein the piston 10 has been moved along the axis 18 into the housing 13. The scraping elements 16 were pivoted from the insertion position shown in FIG. 2*a* into a scraping position S. In the scraping position S, the scraping edge 17 of the scraping elements 16 is pressed against the inner surface 19 of the housing 13. The liquid 12 in the envelope 11 is emptied through the discharge opening 14 of the housing 13 upon further axial movement of the piston. Thereby, the scraping edge 17 remains in scraping contact with the inner surface 19 of the housing and compresses the upper edge of the bag 11 as there is no gap between the scraping element 16 and the inner surface 19 of the housing 13. No parts of the envelope 11 can pass between the piston 10 and the housing 13. The arrangement 11 is particularly useful for envelopes comprising a pasty liquid such as a printing ink. Such inks typically have a viscosity of from 2 Pa.s to 20 Pa.s at 40° C. The envelopes typically comprise about 5 kg up to 250 kg of a printing ink.

FIG. 3 shows an enlarged cross sectional view of the outer edge 15 of a piston and of a scraping element 16, which is pivotably attached to the outer edge 15 of the piston 10. In FIG. 3, a projection 32 of the scraping element 16 is snapped into a protrusion 31 of the piston 10. The scraping element is preferably made of plastic material, such as POM or Polyamid. The piston 10 is made of aluminium or steel. In FIG. 3, the piston is inserted into the housing 13. The scraping element 16 is in the insertion position I and the scraping edge 17 is arranged at a distance $d_I$ from the axis of the piston. The distance $d_I$ is designed in such a way that the scraping edge 17 does not engage the inner surface 19 of the housing 13. The piston 10 may therefore be easily inserted into the housing 13.

The scraping edge is formed as the intersection of two surfaces 22, 23, which enclose an angle α which is smaller than 90°. The scraping element 16 is further provided with a lever 20 and a spring element 21. In FIG. 3 which shows the scraping element 16 in the insertion position, the lever 20 is still on the outside of the housing 13 and the spring element 21 is not tensioned. Upon axial movement of the piston 10, the lever 20 of the scraping element 16 will contact the upper edge 33 of the housing 13. Contact between the upper edge 33 and the lever 20 will induce a pivoting movement of the scraping element 16 into a scraping position S shown in FIG. 4.

After complete insertion of the scraping element 16 in the housing 13, the lever 20 engages the interior surface 19 of the housing 13. The scraping element 16 is pivoted and the scraping edge 17 is arranged in a distance $d_s$ which is larger than the distance $d_I$ shown in FIG. 3. The scraping edge 17 is in engaging contact with the inner surface 19 of the housing 13. By action of the lever 20, the scraping element 17 is pressed against the inner surface 19 with a certain force. Due to this engaging contact and due to the sharp angle α which is formed between the surfaces 22 and 23, the scraping edge 17 pushes the upper part of the emptied envelope 11 downwardly. Passage of the envelope 11 between the piston 10 and the housing 13 is prevented. In the scraping position S as shown in FIG. 4, the spring element 21 is tensioned. During the pivoting movement from the insertion position I in the scraping position S, the spring element 21 first contacts the outer edge 15 of the piston. After further pivoting of the scraping elements 16, the spring element 21 is tensioned. When the piston 10 is removed from the housing 13, the scraping element 16 will automatically pivot back into the insertion position I due to the spring element 21.

FIG. 5 schematically shows a view onto a piston 10. The piston has a circular outer edge 15. A plurality of scraping elements 16 are regularly arranged on the outer edge 15 of the piston 10.

FIGS. 6*a* and 6*b* show a further embodiment of the invention. The scraping element 16 is not attached pivotably to the outer edge of the piston 10 but is horizontally movable between an insertion position I shown in FIG. 6*a* and a scraping position S shown in FIG. 6*b*. Movement between these two positions may be made with a schematically shown moving means 30. In the insertion position I, the scraping edge 17 is arranged such that it will not engage the inner surface 19 of the housing 13. In the scraping position S shown in FIG. *6b*, the scraping element 16 is displaced radially outwardly and the scraping edge 17 contacts the inner surface 19 of the housing 13.

In as much as the invention is subject to modifications and variations, the foregoing description and drawings should not be regarded as limiting the invention which is defined by the following claims and various combinations thereof.

What is claimed is:

1. A piston for compressing and emptying a bag-like envelope containing a pasty liquid, in a rigid outer housing with a discharge opening, wherein the piston is axially movable along an axis and comprises on its outer edge at least one scraping element separate from the piston having a scraping edge, said scraping element being movably connected to said outer edge and being movable between a first insertion position and a second scraping position, wherein in said insertion position, said scraping edge of said scraping element is arranged at a distance from the axis of the piston which is smaller than the distance of said scraping edge from the axis of the piston in the scraping position, and wherein in said scraping position, said scraping edge is engageable with an inner surface of the housing.

2. A piston according to claim 1, wherein the scraping element is pivotably connected to the outer edge of the piston, the scraping element being pivotable between the insertion position and the scraping position.

3. Piston according to claim 2, wherein the scraping element comprises a lever for pivoting the scraping element into the scraping position, the lever being engageable with the inner surface of the housing in the insertion position of the scraping element.

4. Piston according to claim 1, wherein the scraping element comprises a spring element, the spring element being tensioned in the scraping position.

5. Piston according to claim 1, wherein the scraping element is integrally formed of plastic material.

6. Piston according to claim 1, wherein the scraping edge is formed as an intersection of two surfaces enclosing an angle <90°.

7. Piston according to claim 1, wherein the scraping element is snapped onto the outer edge of the piston.

8. Piston according to claim 1, wherein the outer edge is circular and comprises from 4 up to 48 regularly arranged scraping elements.

9. Arrangement for emptying a bag-like envelope containing a pasty liquid, the arrangement comprising a rigid housing for the envelope and a piston axially movable along an axis for compressing the envelope and for discharging the liquid through a discharge opening in the housing, wherein the piston has on an outer edge at least one scraping element separate from the piston which is movably connected to said outer edge and moveable between a first insertion position and a second scraping position, and wherein said scraping element has a scraping edge, and wherein in said insertion position, said scraping edge is radially spaced from an inner surface of the housing and wherein in said scraping position, said scraping edge is pressed against said inner surface of the housing.

10. Arrangement according to claim 9, wherein the scraping element is pivotably attached to the outer edge of the piston.

11. Arrangement according to claim 10, wherein the scraping element comprises a lever for pivoting the scraping element into the scraping position, wherein the lever is engageable with the inner surface of the housing in the insertion position.

12. Arrangement according to claim 9, wherein the scraping element comprises a spring element, the spring element being tensioned in the scraping position.

13. Arrangement according to claim 9, wherein the scraping element is integrally formed of plastic material.

14. Arrangement according to claim 9, wherein the scraping edge is formed by the intersection of two surfaces enclosing an angle <90°.

15. Arrangement according to claim 9, wherein the scraping element is snapped onto the outer edge of the piston.

16. Arrangement according to claim 9, wherein the outer edge of the piston and the inner surface of the housing are circular and in that between four and up to 48 scraping elements are regularly arranged on the outer edge of the piston.

* * * * *